US012090492B2

(12) United States Patent
Bibby

(10) Patent No.: US 12,090,492 B2
(45) Date of Patent: Sep. 17, 2024

(54) CYCLONIC AIR FILTRATION EQUIPMENT

(71) Applicant: Darren Richard Bibby, Johannesburg (ZA)

(72) Inventor: Darren Richard Bibby, Johannesburg (ZA)

(73) Assignee: Darren Richard Bibby, Johannesburg (ZA)

( * ) Notice: Subject to any disclaimer, the term of this patent is extended or adjusted under 35 U.S.C. 154(b) by 65 days.

(21) Appl. No.: 17/459,959

(22) Filed: Aug. 27, 2021

(65) Prior Publication Data

US 2021/0387207 A1 Dec. 16, 2021

Related U.S. Application Data

(63) Continuation of application No. PCT/IB2021/050393, filed on Jan. 20, 2021.

(30) Foreign Application Priority Data

Jan. 21, 2020 (ZA) ................................ 2020/00390

(51) Int. Cl.
*B04C 3/06* (2006.01)
*B04C 3/04* (2006.01)
*B04C 3/00* (2006.01)

(52) U.S. Cl.
CPC .................. *B04C 3/06* (2013.01); *B04C 3/04* (2013.01); *B04C 2003/003* (2013.01); *B04C 2003/006* (2013.01)

(58) Field of Classification Search
CPC ....... B04C 3/06; B04C 3/04; B04C 2003/003; B04C 2003/006
See application file for complete search history.

(56) References Cited

U.S. PATENT DOCUMENTS 1,886,548 A * 11/1932 Horne ........................ B04C 5/28 55/432
2,004,468 A * 6/1935 Hawley ..................... B04C 3/04 55/347

(Continued)

FOREIGN PATENT DOCUMENTS

EP 0 558 091 A1 9/1993
EP 2 042 223 A1 4/2009

*Primary Examiner* — Dung H Bui
(74) *Attorney, Agent, or Firm* — MORGAN, LEWIS & BOCKIUS LLP

(57) ABSTRACT

The invention relates to an air filtration bank (100) and an air filtration system (50) for removing grit or impurities from an airstream using a plurality of cyclonic air classifiers (10) arranged in 2×2 arrays in each air filtration bank (100). The system (50) comprises a plurality of interconnected, modular air filtration banks (100) arranged side-by-side and a grit collecting chute (5). In order to improve airflow efficiency and particle separation, each cyclonic air classifier (10) includes a vortex-inducing inlet duct (13), an extraction pipe (16) and a conical diffuser (15). The conical diffusers (15) of upper and lower cyclonic air classifiers are of different lengths such that their respective waste outlets are not coplanar which serves to limit waste outlet flow interference and results in less pressure drop across the air filtration bank, which in turn leads to more efficient particle removal.

15 Claims, 7 Drawing Sheets

(56) References Cited

U.S. PATENT DOCUMENTS

| | | | | | |
|---|---|---|---|---|---|
| 2,461,677 | A * | 2/1949 | Burdock | B04C 5/28 | 55/436 |
| 2,662,610 | A * | 12/1953 | Heinrich | B04C 3/04 | 55/432 |
| 2,806,551 | A * | 9/1957 | Heinrich | B04C 3/04 | 55/340 |
| 3,360,909 | A * | 1/1968 | Barnerias | B04C 5/081 | 209/722 |
| 3,469,566 | A * | 9/1969 | Wilkinson | F02M 35/022 | 55/467 |
| 3,590,560 | A * | 7/1971 | Pall | B04C 3/00 | 55/396 |
| 3,713,280 | A * | 1/1973 | Keller | B01D 45/12 | 55/435 |
| 4,008,059 | A * | 2/1977 | Monson | B01D 45/14 | 55/448 |
| 4,050,913 | A * | 9/1977 | Roach | B01D 50/20 | 96/381 |
| 4,158,449 | A * | 6/1979 | Sun | B01D 46/10 | 55/306 |
| 4,162,906 | A * | 7/1979 | Sullivan | B04C 3/00 | 210/512.1 |
| 4,289,611 | A * | 9/1981 | Brockmann | B04C 3/06 | 209/710 |
| 4,394,145 | A * | 7/1983 | Sundseth | B01D 45/16 | 55/424 |
| 4,537,608 | A * | 8/1985 | Koslow | B01D 50/20 | 55/347 |
| 4,746,340 | A * | 5/1988 | Durre | B01D 45/12 | 55/347 |
| 4,971,603 | A * | 11/1990 | Prinsloo | B04C 3/06 | 55/345 |
| 5,480,464 | A * | 1/1996 | De Villiers | B01D 39/1615 | 55/320 |
| 6,406,505 | B1 * | 6/2002 | Oh | A47L 5/362 | 55/459.1 |
| 6,540,802 | B2 * | 4/2003 | Trautmann | F02M 35/168 | 55/432 |
| 6,884,273 | B2 * | 4/2005 | Kopec | B04C 3/04 | 55/346 |
| 6,932,849 | B2 * | 8/2005 | Sheidler | B01D 50/20 | 55/347 |
| 7,244,282 | B2 * | 7/2007 | Greif | B01D 45/16 | 55/347 |
| 7,491,254 | B2 * | 2/2009 | Krisko | B01D 45/12 | 55/482 |
| 8,012,227 | B2 * | 9/2011 | Greif | B01D 50/20 | 55/482 |
| 8,262,761 | B2 * | 9/2012 | Babb | B04C 3/04 | 55/346 |
| 2004/0094114 | A1 * | 5/2004 | Riehmann | F02M 35/022 | 55/321 |
| 2004/0256312 | A1 * | 12/2004 | Gomez | B03C 1/30 | 210/512.3 |
| 2005/0229559 | A1 * | 10/2005 | Oh | B04C 3/06 | 55/456 |
| 2006/0101795 | A1 * | 5/2006 | Krisko | B01D 45/12 | 95/268 |
| 2006/0130445 | A1 * | 6/2006 | Park | B04C 9/00 | 55/346 |
| 2008/0006250 | A1 * | 1/2008 | Bula | F02C 7/052 | 123/184.21 |
| 2014/0299540 | A1 * | 10/2014 | Ackermann | B01D 21/26 | 210/512.3 |
| 2014/0373490 | A1 | 12/2014 | Wuebbeling | | |
| 2015/0157972 | A1 * | 6/2015 | Bratten | B01D 46/446 | 96/397 |
| 2015/0246307 | A1 * | 9/2015 | Whitehead | B01D 45/16 | 55/459.4 |
| 2015/0343366 | A1 | 12/2015 | Wuebbeling | | |
| 2019/0001348 | A1 * | 1/2019 | Ingram | B04C 3/06 | |
| 2019/0082925 | A1 * | 3/2019 | Conrad | A47L 9/2847 | |

* cited by examiner

CYCLONIC AIR FILTRATION EQUIPMENT

CROSS-REFERENCE TO RELATED APPLICATION

This application is a continuation of International Patent Application No. PCT/IB2021/050393, filed Jan. 20, 2021 and published as WO 2021/148945 A1, which claims priority to South African Application No. 2020/00390, filed Jan. 21, 2020, the entire contents of which applications is incorporated herein for all purposes by this reference.

FIELD OF THE INVENTION

This invention relates to ventilation, filtration and/or air-conditioning equipment. More specifically, the invention relates to an air filtration system including cyclonic air classifiers for separating large or heavy particles, such as dust particles or other impurities, from an airstream by centrifugal action of the classifier.

BACKGROUND OF THE INVENTION

Different forms of cyclones are used throughout industry in different applications. For example, hydrocyclones are used often in mining applications to separate heavy particulate material from tailings by subjecting the tailings or slurry to centrifugal forces in the cyclone. In a vertical orientation, heavier particles are forced radially outward and slide down an inside of the cyclone to an underflow opening toward a bottom where it is discharged from the cyclone and typically used as compacting material to build a tailings dam whilst the finer material and fluids are sucked out of an upwardly disposed, central opening known as an overflow opening. Cyclones are not always vertically orientated and can also be used in a horizontal orientation.

The Applicant is also aware of existing air cyclones or classifiers which make use of the same principles to remove dust particles or other impurities from an airstream. In existing air ventilation systems, cyclones are used in a pre-filtration step, upstream of material air filters, to prolong the life of such filters. The Inventor has determined, through fluid dynamic analysis of a number of different configurations of air cyclones, that the specific geometry of an air cyclone is crucial to its performance in terms of particle separation efficiency and energy efficiency. The Inventor believes that the performance of existing air cyclones or classifiers is inadequate in that most classifiers either display poor energy efficiency, i.e. a large pressure drop is created across the cyclone, or inadequate particle separation is experienced over a range of particle sizes.

The present invention aims to address, at least to some extent, the above drawbacks.

SUMMARY OF THE INVENTION

In accordance with a first aspect of the invention, there is provided an air filtration bank which includes:

- at least two adjacent cyclonic air classifiers, each cyclonic air classifier including a hollow classifier body which includes:
  - a vortex-inducing inlet duct at an upstream inlet, the hollow classifier body defining a longitudinal axis;
  - a tubular extraction pipe, arranged downstream of the inlet, the extraction pipe defining a discharge outlet which is axially aligned with the inlet; and
  - an at least partially conical diffuser which extends from the inlet duct toward the extraction pipe such that a downstream end of the at least partially conical diffuser and the extraction pipe together define a waste outlet in a plane transverse to the longitudinal axis of the hollow classifier body; and
- a frame to which the cyclonic air classifiers are mounted, wherein the vortex-inducing inlet ducts of the adjacent cyclonic air classifiers are configured to induce oppositely orientated vortices in the respective hollow classifier bodies of the adjacent cyclonic air classifiers and wherein the at least partially conical diffusers of the adjacent cyclonic air classifiers are of different lengths such that their respective waste outlets are not coplanar and are longitudinally spaced apart along the air filtration bank which serves to limit waste outlet flow interference and results in less pressure drop across the air filtration bank, which in turn leads to more efficient particle removal, wherein a cyclonic air classifier having a shorter conical diffuser, when compared to a length of the other conical diffuser, includes a deflector which is connected to an outer surface of the extraction pipe, downstream of the waste outlet, and wherein the deflector extends radially outwardly away from the extraction pipe thus serving further to limit waste outlet flow interference between the adjacent cyclonic air classifiers.

The air filtration bank may be modular. The air filtration bank may be connectable to adjacent air filtration banks. The air filtration bank may include a 2×2 array of four cyclonic air classifiers, wherein inlet ducts of diagonally opposing cyclonic air classifiers in the array are configured to induce vortices in their respective hollow classifier bodies in the same direction.

The air filtration bank may include an outwardly inclined, operatively upper wall secured to the frame. The upper wall may define an inner cavity about the waste outlets of the uppermost cyclonic air classifiers in the 2×2 array. The inner cavity may be configured to prevent excessive pressure build-up about the waste outlets. The outwardly inclined, operatively upper wall may have an openable inspection hatch.

Each inlet duct may include a plurality of equiangularly spaced apart, angled vanes. The vanes may be configured to induce a vortex inside the hollow classifier body and wherein vane configurations of the cyclonic air classifiers of the air filtration bank alternate in orientation, from top to bottom and side to side such that the vanes of adjacent cyclonic air classifiers are configured to induce vortices in their respective hollow classifier bodies in opposite directions.

Each inlet duct may be removably connected to the partially conical diffuser. Each inlet duct may include eight equiangularly spaced apart angled vanes.

Each inlet duct may include a square to round inlet shroud. Inner edges of adjoining shrouds may be arranged in abutment. Each inlet duct may include an axially extending, circular cylindrical shroud arranged about the vanes. The square to round inlet shroud may be concave and may be removably connected to the circular cylindrical shroud. An operatively upper pair of cyclonic air classifiers may have conical diffusers which are shorter than that of an operatively lower pair of cyclonic air classifiers.

The inlet duct may include an axially aligned hub having a central conical cap to ensure smooth airflow. The plurality of vanes may extend radially outwardly from circumferentially spaced positions on the hub. Each vane may have a straight upstream edge which faces in an axial direction and is orthogonal to the longitudinal axis. Each vane may have a downstream or trailing edge which is angled at about 60 degrees relative to the longitudinal axis of the classifier body. Each vane may diverge from the hub to a radially outward distal end or tip of the vane.

The air filtration bank may include a grit collection chute or hopper which is connected in flow communication to annular waste outlets of the cyclonic air classifiers for collecting rejected particles expelled from the cyclonic air classifiers.

A conical part of the diffuser diverges in a downstream direction. An inlet diameter may be substantially identical to a discharge outlet diameter. The extraction pipe may extend at least partially into the diffuser and may be concentric with the diffuser. An axially outer end of the extraction pipe is joined to a rear wall which serves to isolate the discharge outlet from the waste outlet.

The invention extends to an air filtration system which includes:

- a plurality of air filtration banks as described above arranged side-by-side in inline fashion in an air duct; and
- at least one grit collecting chute or hopper which is arranged in flow communication with the waste outlets of the respective cyclonic air classifiers.

The grit collecting chute may include an auger or screw conveyor which is configured to discharge grit collected in a trough of the chute. The grit collecting chute may include at least one openable inspection hatch. The grit collecting chute may be hermetically sealed to the air filtration banks to prevent backward airflow from hampering the discharge of particles from the waste outlets into the chute.

The air filtration bank may include an array of four cyclonic air classifiers. The inlet ducts of diagonally opposing cyclonic air classifiers in the array being configured to induce vortices in their respective hollow classifier bodies in the same direction. The array may be a 2×2 matrix. Vane configurations of the cyclonic air classifiers of the air filtration bank may alternate in orientation, from top to bottom and side to side.

The air filtration bank may include cyclonic air classifiers having partially conical diffusers of different lengths such that the air filtration bank is configured to filter out particles of different sizes.

The conical diffuser of each classifier may define an annular waste outlet about the extraction pipe through which rejected particles are operatively expelled, the waste outlet being in flow communication with a grit collecting chute below.

The inlet may be circular. Similarly, the discharge outlet may be circular.

The air filtration bank may operatively be connected in line with one or more air filters. The air filtration bank may include an outer body enclosing the frame. The outer body may include an openable inspection hatch.

The classifier may be made from polymeric material. Preferably, it may be made from metal such as from 5 mm steel.

The grit collecting chute may include any one of a screw conveyor, rotary vane feeder or flap valve for discharging of expelled particles.

BRIEF DESCRIPTION OF THE DRAWINGS

The invention will now be further described, by way of example, with reference to the accompanying drawings.

In the drawings.

DETAILED DESCRIPTION WITH REFERENCE TO THE DRAWINGS

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 1:
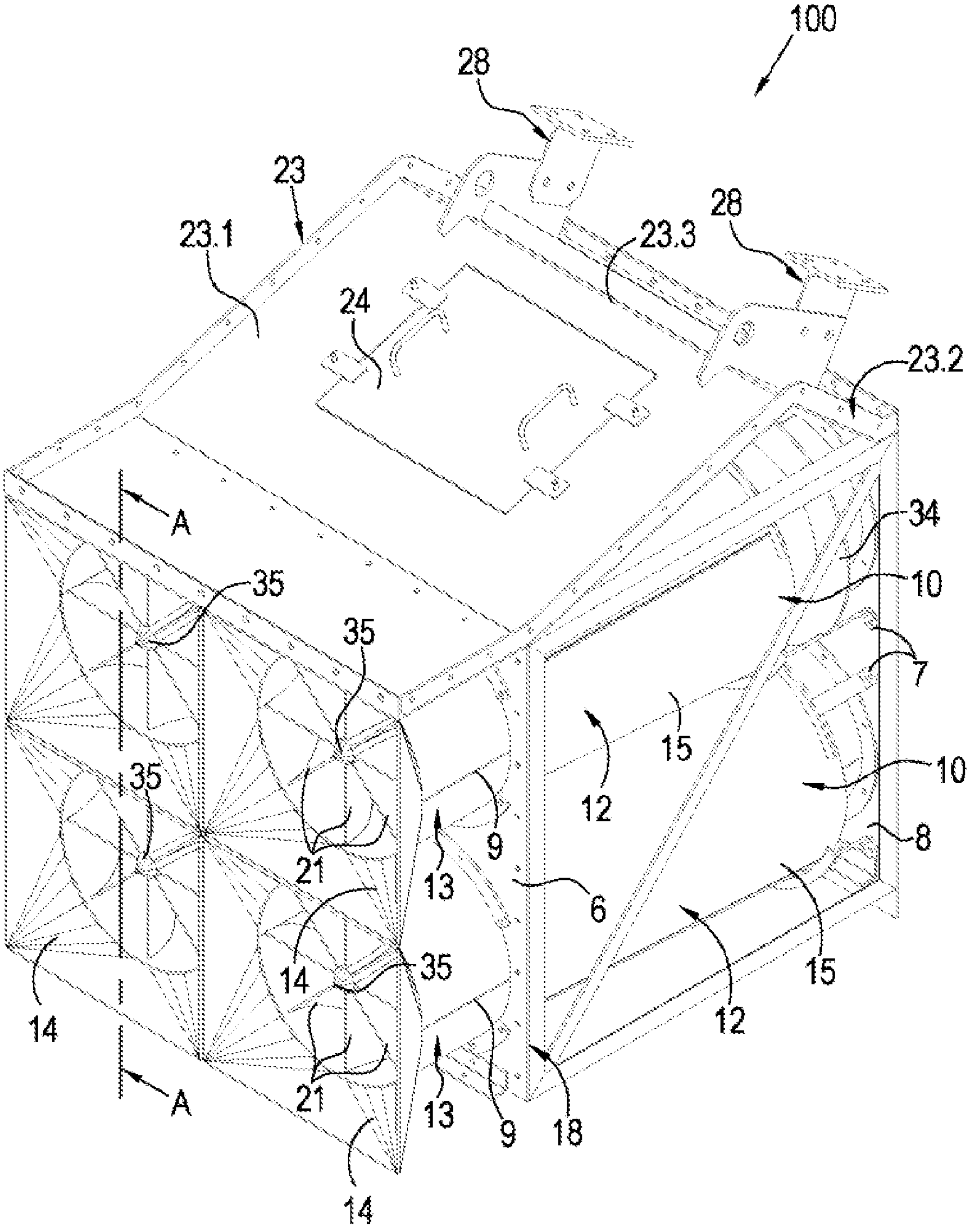
FIG. 1 is a three-dimensional view of an air filtration bank in accordance with one aspect of the invention.
Figure 2:
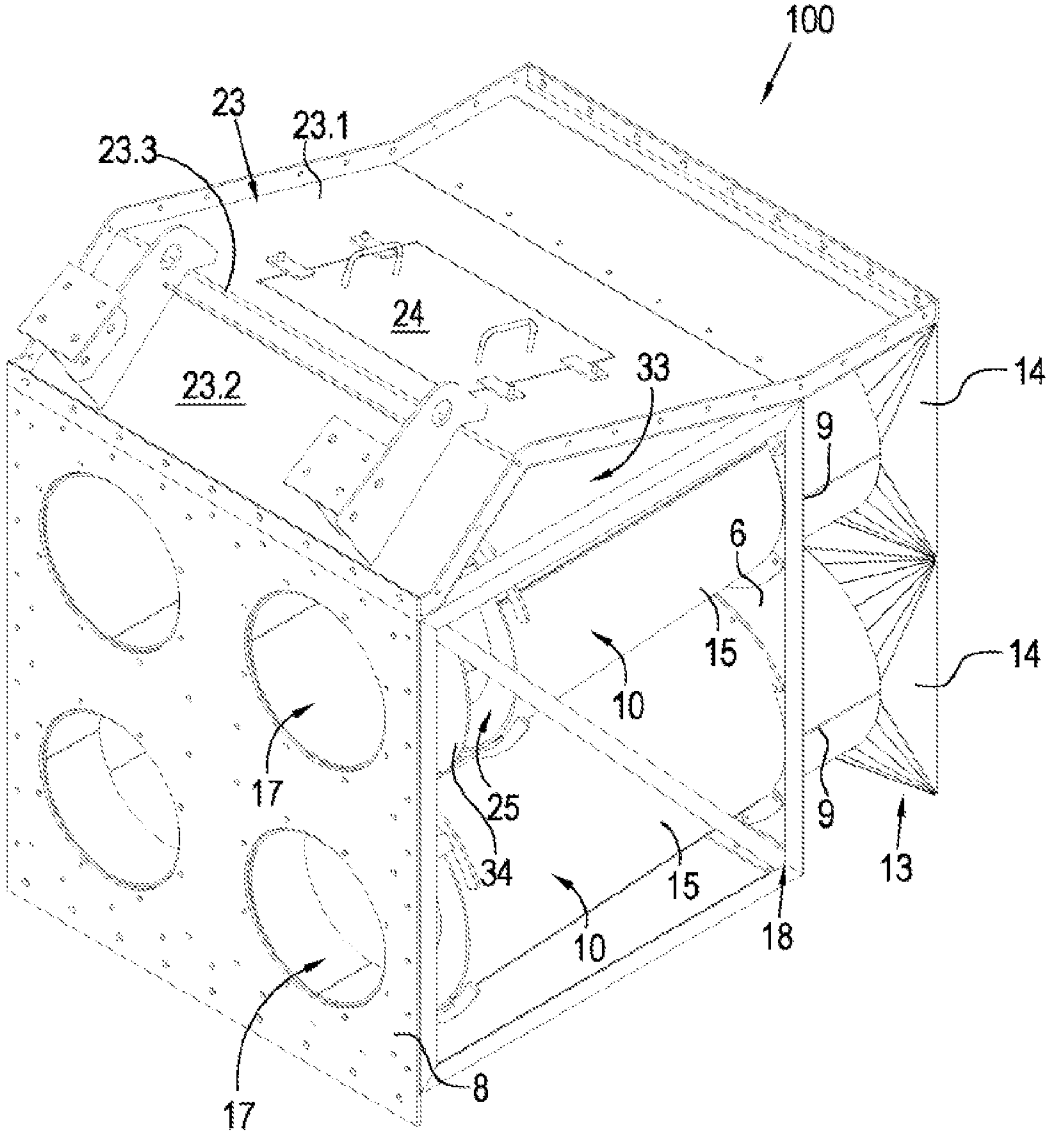
FIG. 2 is a downstream three-dimensional view of the air filtration bank of FIG. 1.
Figure 3:
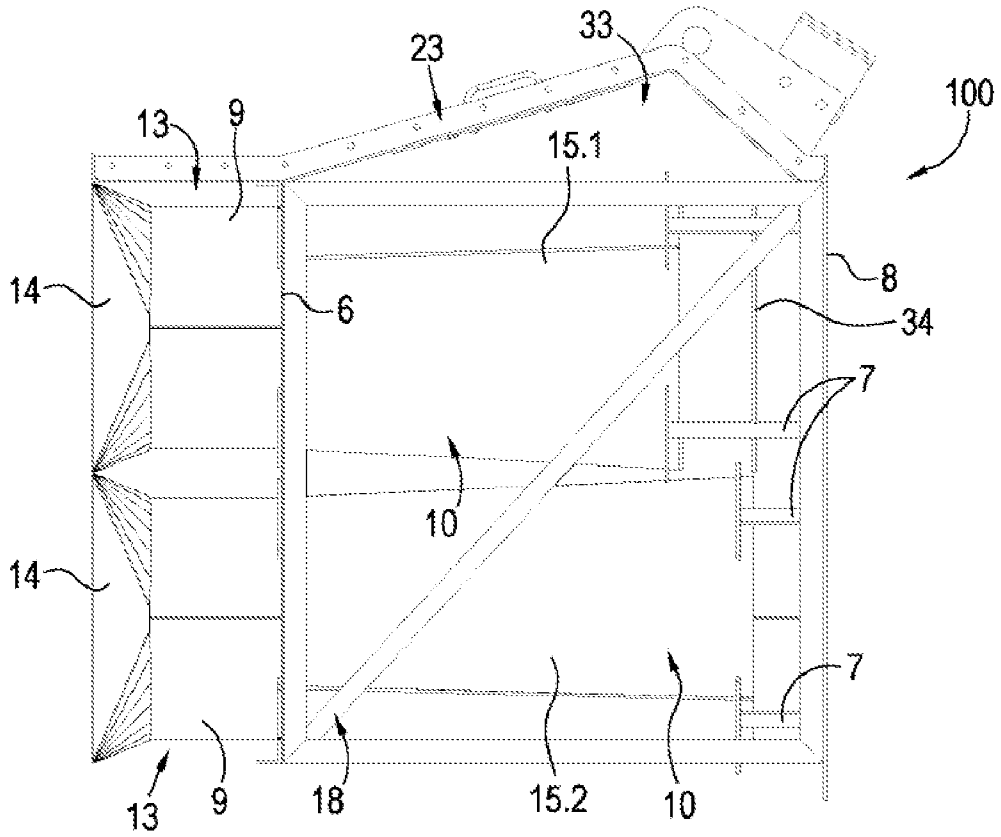
FIG. 3 is a side view of the air filtration bank of FIG. 1.
Figure 4:
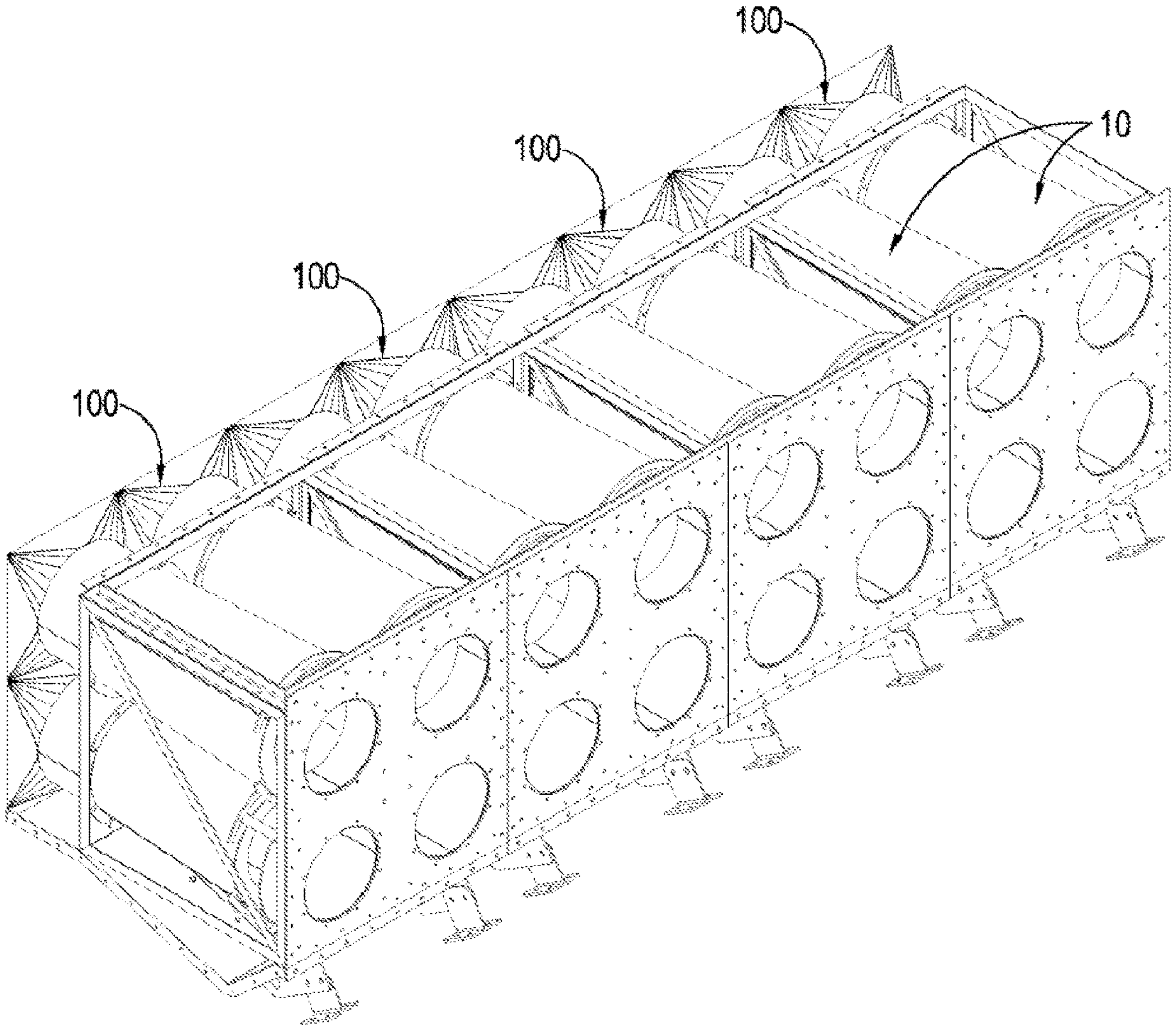
FIG. 4 illustrates a three-dimensional view of a plurality of air filtration banks joined together.

In the figures, reference numeral 100 refers generally to a modular air filtration bank in accordance with a first aspect of the invention which includes an array of four cyclonic air classifiers 10 arranged in a 2×2 matrix as shown in FIGS. 1 to 3. As illustrated in FIG. 4, a series of modular air filtration banks 100 arranged side-by-side operatively form part of an air filtration system 50 in accordance with another aspect of the invention (see FIGS. 6 and 7). The air filtration system 50 is used in air conditioning and/or filtration installations in order to remove oversized dust particles or other impurities from an airstream, optionally, before it passes through a material filter. An airflow direction through the air filtration system 50 and air filtration banks 100 is indicated by arrow 30 in FIGS. 5 and 6. Arrows 31, 32 in FIGS. 5 and 6 indicate a direction of discharge of heavy particles which have been filtered out by the air filtration banks 100 into a grit collecting chute or hopper 5 below.

Briefly, as an airstream with entrained dust particles or other impurities passes through a cyclonic air classifier 10 of the bank 100, a vortex (spiraling or cyclonic motion) is induced by way of a vortex-inducing inlet duct 13 having a plurality of equiangularly spaced apart arcuate vanes 21 provided at an inlet of a hollow classifier body 12. In a preferred embodiment illustrated in FIGS. 1 to 5, eight equiangularly spaced apart arcuate or angled vanes 21 are provided in each inlet duct 13.2. The vanes 21 angularly overlap each other such that, when viewed axially, no gaps between vanes 21 are visible. By implication air cannot pass straight through the inlet duct 13 without the vanes 21 inducing a vortex. As a result, heavy dust particles or impurities are slewed radially outward due to centrifugal forces and are discharged from the classifier 10 via an annular waste outlet 25 (see FIGS. 2 and 5), whilst smaller clean air particles are extracted from the classifier body 12 via a central discharge outlet 17 defined by a tubular extraction pipe 16.

Figure 5:
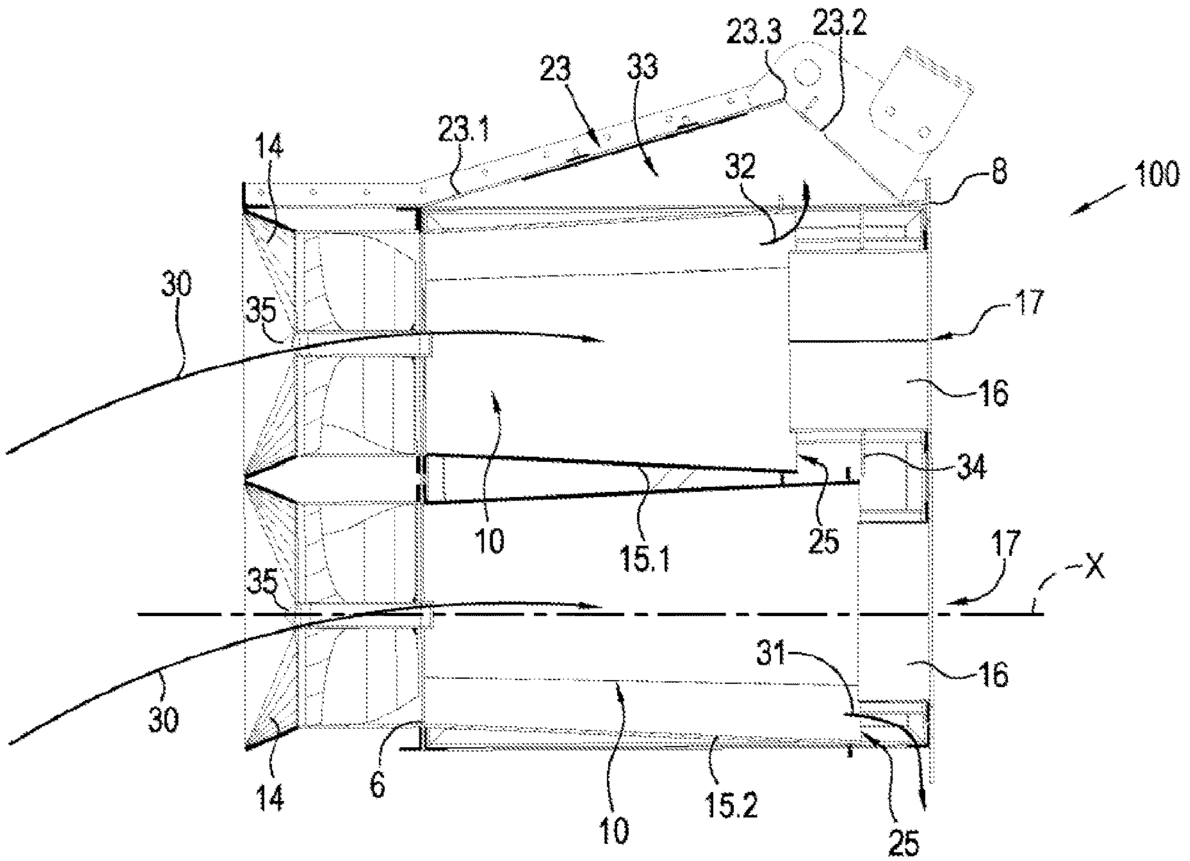
FIG. 5 shows a longitudinal sectional view taken along lines A-A shown in FIG. 1.

Each hollow classifier body 12 defines a longitudinal axis X (see FIG. 5). Each inlet duct 13 includes a square to round inlet shroud 14 which directs the airstream onto the vanes 21. Inner edges of adjoining inlet shrouds 14 are in abutment to ensure smooth airflow through the air filtration bank 100. Each inlet duct 13 also includes a circular cylindrical shroud 9 arranged concentrically about the vanes 21. The square to round inlet shroud 14 is concave and is connected to the circular cylindrical shroud 9. Downstream of the inlet duct 13, the classifier body 12 includes a conical diffuser 15 which is connected to the inlet duct 13 at one end, and to a downstream rear wall 8 at the other end via a number of protruding legs or brackets 7. The conical diffuser 15 diverges in a downstream direction. The vortex inducing inlet duct 13 is removably connected to the conical diffuser 15 which means that the inlet duct 13 can be easily removed and replaced if worn. I.e., this obviates replacement of the entire classifier body 12 when only the inlet duct 13 is worn. The same applies to the square to round inlet shroud 14.

Each classifier 10 has a tubular extraction pipe 16 (see FIG. 5), arranged downstream of the inlet, concentric with and partially within the conical diffuser 15. The discharge outlet 17 is axially aligned with the inlet. The air filtration bank 100 further includes a frame 18 to which each of the cyclonic air classifiers 10 are mounted. Each air filtration bank 100 includes an inclined, operatively upper, outwardly protruding wall 23 secured to the frame 18 which defines an inner cavity 33 about the waste outlets 25 of the uppermost cyclonic air classifiers 10 in the 2×2 array or matrix. The inclined upper wall 23 comprises a slanted major wall 23.1 and an oppositely slanted minor wall 23.2 which meet at an apex 23.3. The slanted major wall 23.1 has an openable inspection hatch 24 as shown in FIG. 1. The waste outlets 25 lead into a particle rejection zone 22 (see FIG. 6) which is defined between an upstream wall 6, provided about an interface of the circular cylindrical shroud 9 and the conical diffuser 15 of the classifier body 12, at one end, the downstream rear wall 8 at the other end, the inclined upper wall 23 above and the grit collecting chute 5 below (see FIG. 6). The inner cavity 33 is in flow communication with the particle rejection zone 22 and is configured to prevent excessive pressure build-up about the uppermost waste outlets 25, hence improving particle removal and airflow through the filtration bank 100.

In order to achieve optimal airflow through the air filtration bank 100, the vortex-inducing inlet ducts 13, specifically the arcuate vanes 21 of adjacent cyclonic air classifiers 10, are configured to induce oppositely orientated vortices in the respective conical diffusers 15.

Accordingly, the vanes 21 of adjacent cyclonic air classifiers 10 are arranged to induce vortices in their respective hollow classifier bodies 12 in opposite directions.

Furthermore, operatively upper 15.1 and lower 15.2 pairs of conical diffusers 15 of each air filtration bank 100 have different lengths, as can be seen in FIGS. 3 and 5. This has the effect that the waste outlets 25 of the respective pairs 15.1, 15.2 are not coplanar and are longitudinally spaced apart along the air filtration bank 100. This serves to limit waste outlet flow interference and results in less pressure drop across the air filtration bank 100, which in turn leads to more efficient particle removal. In addition, as a result of the differing lengths of the conical diffusers 15.1, 15.2, the air filtration bank 100 is configured to filter out particles of different sizes. As can be seen, the operatively upper pair of cyclonic air classifiers 10 have conical diffusers 15.1 which are shorter than the conical diffusers 15.2 of an operatively lower pair of cyclonic air classifiers (see FIG. 3).

As mentioned, each conical diffuser 15 defines an annular waste outlet 25 about the extraction pipe 16 through which rejected particles are operatively expelled into the particle rejection zone 22. The particle rejection zone 22 and inner cavity 33 connect the waste outlets 25 in flow communication with the grit collecting chute 5 below. Furthermore, the cyclonic air classifiers 10 having the shorter conical diffusers 15.1, i.e. the operatively uppermost classifiers, each include an annular deflector 34 which is connected to an outer surface of the extraction pipe 16, downstream of the waste outlet 25. The deflector 34 extends radially outwardly away from the extraction pipe 16 thus serving further to limit waste outlet flow interference between upper and lower cyclonic air classifiers 10 in the air filtration bank 100, as can be seen in FIG. 5. The deflector 34 is more or less longitudinally aligned with a downstream end of the conical diffuser 15.2 below.

With reference to FIGS. 1 and 5, each inlet duct 13 includes an axially aligned hub having a central conical cap 35 to ensure smooth airflow. Each of the vanes 21 extend radially outwardly from circumferentially spaced positions on the hub. Each vane 21 has a straight upstream edge which faces in an axial direction and is orthogonal to the longitudinal axis X and a downstream or trailing edge which is angled at about 60 degrees relative to the longitudinal axis X of the classifier body 12. Each vane 21 diverges from the hub to a radially outward distal end or tip of the vane 21.

Figure 6:
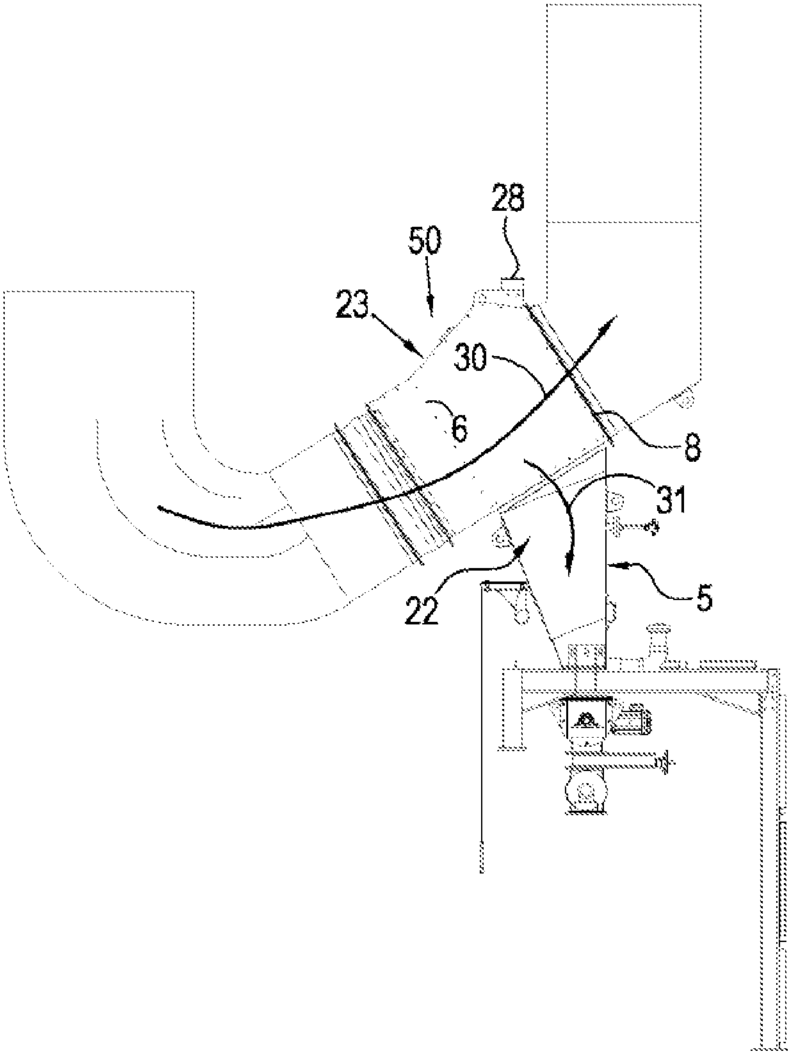
FIG. 6 shows a side elevation of an air filtration system in accordance with another aspect of the invention.
Figure 7:
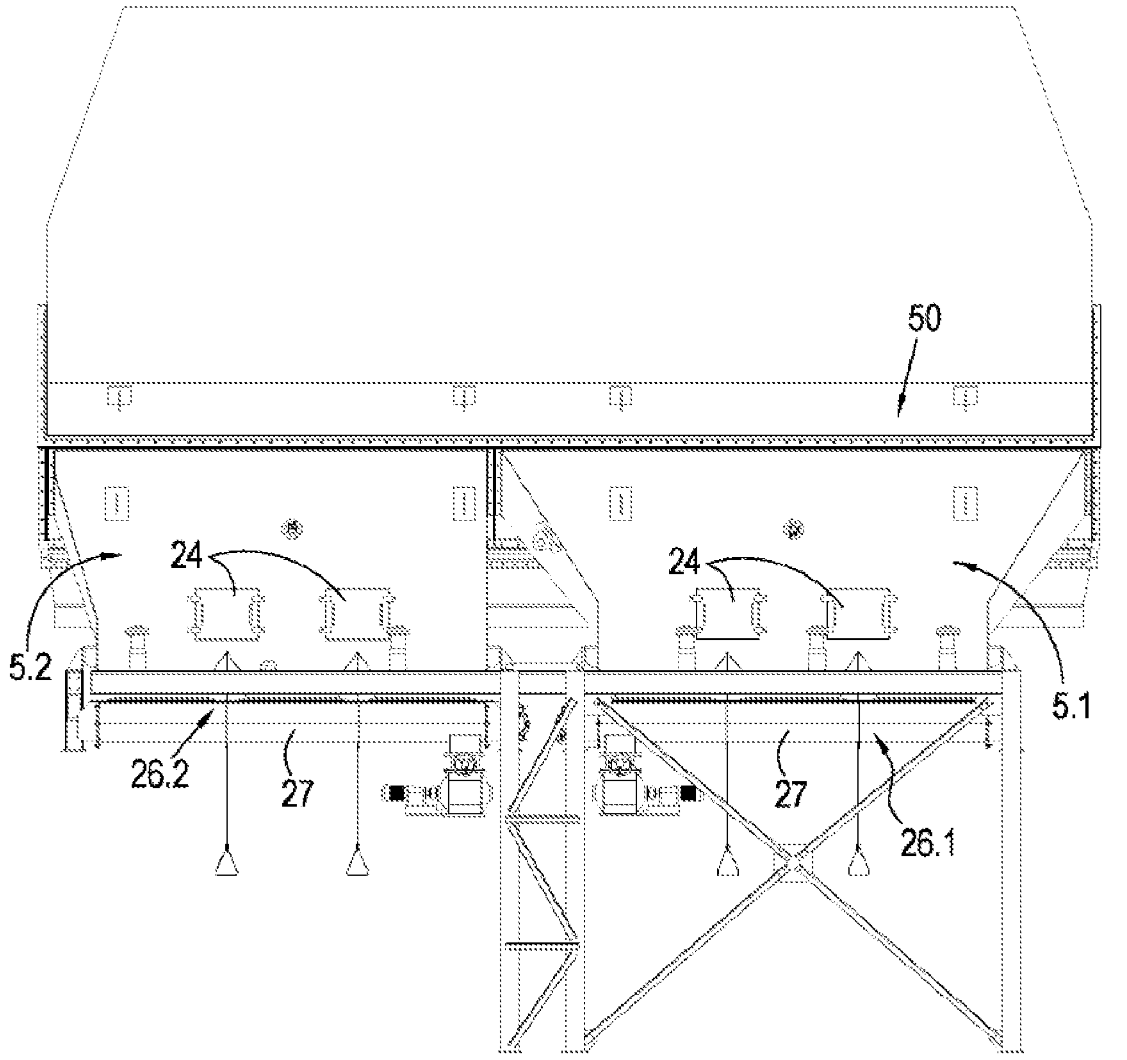
FIG. 7 shows a front elevation of the air filtration system of FIG. 6.

As can best be seen in FIG. 6, the air filtration system 50 is operatively connected in inline fashion to ducting. Airflow direction through the system 50 is indicated by arrow 30. One or more material filters may be provided downstream of the filtration system 50 to filter out finer particles not removed by the air classifiers 10. A pair of mounting brackets 28 for mounting the air filtration bank 100 to supports is provided at the apex 23.3 of the operatively upper wall 23. In an example embodiment, and as illustrated in FIG. 7, the air filtration system 50 includes a primary grit collecting chute 5.1 and an adjacent secondary grit collecting chute 5.2. A screw conveyor or auger 26.1, 26.2, rotary vane feeder or flap valve of sorts is arranged in a trough 27 connected to a distal end of each chute 5.1, 5.2. The screw conveyors 26.1, 26.2 are configured to discharge grit collected in the troughs 27. Each grit collecting chute has two openable inspection hatches 24. The distal end of each chute 5.1, 5.2 is sealed by the screw conveyors to prevent backward airflow from hampering the discharge of heavy particles from the airstream passing through the filtration system 50.

The Applicant believes that the specific configuration of the air filtration system 50, in accordance with one aspect of the invention, comprising a series of modular air filtration banks 100, in accordance with another aspect of the invention, arranged side-by-side, each of which includes an array of cyclonic air classifiers 10 having conical diffusers 15.1, 15.2 of different lengths and oppositely orientated vortex-inducing inlet ducts 13, amongst other features, as described above, provides for much improved particle separation or filtration and serves to limit waste outlet flow interference which results in less pressure drop across the air filtration bank 100, which in turn leads to more efficient particle removal. Due to the modularity of the air filtration banks 100, the air filtration system 50 can be designed to meet various operational and installation requirements. For example, the filtration banks 100 of the air filtration system 50 can filter out particles from 10 micron upward. From a maintenance perspective, the air filtration system 50 has the advantage that it does not have moving parts such as rotors which may require frequent maintenance to prolong its operative lifespan. Also, as described above, the vortex-inducing inlet ducts 13 can be easily replaced when worn without having to remove the remainder of the cyclonic air classifier 10. The square to round inlet shrouds 14 result in uniform, laminar air flow into the vanes with no dead spots between vane inlets and less wear and tear on the inlet duct 13. They also improve the aerodynamics of the inlet by creating less airflow resistance. Furthermore, the Applicant believes that the angle, curvature and number of vanes (eight) produce increased efficiency by maximising centrifugal vortex motion of the airstream. Also, the diverging conical diffuser 15 allows for maximum maturity of the cyclonic vortex motion, maximising overall efficiency. The deflector 34 further limits waste outlet 25 airflow interference between upper and lower air classifiers. Finally, the grit collection chute or hopper 5 prevents particle build-up and ensures the most efficient and speedy removal of particles from a single outlet.

The invention claimed is:

1. An air filtration bank which includes:

at least two adjacent cyclonic air classifiers, each cyclonic air classifier including a hollow classifier body which includes:

a vortex-inducing inlet duct at an upstream inlet, the hollow classifier body defining a longitudinal axis;

a tubular extraction pipe, arranged downstream of the inlet, the extraction pipe defining a discharge outlet which is axially aligned with the inlet; and an at least partially conical diffuser which extends from the inlet duct toward the extraction pipe such that a downstream end of the at least partially conical diffuser and the extraction pipe together define a waste outlet in a plane transverse to the longitudinal axis of the hollow classifier body; and a frame to which the cyclonic air classifiers are mounted, wherein the vortex-inducing inlet ducts of the adjacent cyclonic air classifiers are configured to induce oppositely orientated vortices in the respective hollow classifier bodies of the adjacent cyclonic air classifiers and wherein the at least partially conical diffusers of the adjacent cyclonic air classifiers are of different lengths such that their respective waste outlets are not coplanar and are longitudinally spaced apart along the air filtration bank which serves to limit waste outlet flow interference and results in less pressure drop across the air filtration bank, which in turn leads to more efficient particle removal, wherein a cyclonic air classifier having a shorter conical diffuser, when compared to a length of the other longer conical diffuser, includes a deflector which is connected to an outer surface of the extraction pipe, downstream of the waste outlet of the shorter conical diffuser, and wherein the deflector extends radially outwardly away from the extraction pipe such that the deflector lies within a plane which is downstream of the waste outlet of the shorter conical diffuser but is coplanar with the waste outlet of the other longer conical diffuser thus serving further to limit waste outlet flow interference between the adjacent cyclonic air classifiers.

2. The air filtration bank as claimed in claim 1, which is modular and connectable to adjacent air filtration banks and which includes a 2×2 array of four cyclonic air classifiers, wherein inlet ducts of diagonally opposing cyclonic air classifiers in the array are configured to induce vortices in their respective hollow classifier bodies in the same direction.

3. The air filtration bank as claimed in claim 2, which includes an outwardly inclined, operatively upper wall secured to the frame, the upper wall defining an inner cavity about the waste outlets of the uppermost cyclonic air classifiers in the 2×2 array, wherein the inner cavity is configured to prevent excessive pressure build-up about the waste outlets.

4. The air filtration bank as claimed in claim 3, wherein the outwardly inclined, operatively upper wall has an openable inspection hatch.

5. The air filtration bank as claimed in claim 2, wherein each inlet duct includes a plurality of equiangularly spaced apart, angled vanes, the vanes being configured to induce a vortex inside the hollow classifier body and wherein vane configurations of the cyclonic air classifiers of the air filtration bank alternate in orientation, from top to bottom and side to side such that the vanes of adjacent cyclonic air classifiers are configured to induce vortices in their respective hollow classifier bodies in opposite directions.

6. The air filtration bank as claimed in claim 5, wherein each inlet duct is removably connected to the partially conical diffuser and includes eight equiangularly spaced apart angled vanes.

7. The air filtration bank as claimed in claim 5, wherein each inlet duct includes a square to round inlet shroud, inner edges of adjoining shrouds being arranged in abutment and wherein each inlet duct includes an axially extending, circular cylindrical shroud arranged about the vanes.

8. The air filtration bank as claimed in claim 7, wherein the square to round inlet shroud is concave and is removably connected to the circular cylindrical shroud.

9. The air filtration bank as claimed in claim 5, wherein the inlet duct includes an axially aligned hub having a central conical cap to ensure smooth airflow and wherein the plurality of vanes extend radially outwardly from circumferentially spaced positions on the hub, each vane having a straight upstream edge which faces in an axial direction and is orthogonal to the longitudinal axis and a downstream or trailing edge which is angled at about 60 degrees relative to the longitudinal axis of the classifier body, and wherein each vane diverges from the hub to a radially outward distal end or tip of the vane.

10. The air filtration bank as claimed in claim 2, wherein an operatively upper pair of cyclonic air classifiers has conical diffusers which are shorter than that of an operatively lower pair of cyclonic air classifiers.

11. The air filtration bank as claimed in claim 2, which includes a grit collection chute or hopper which is connected in flow communication to annular waste outlets of the cyclonic air classifiers for collecting rejected particles expelled from the cyclonic air classifiers.

12. The air filtration bank as claimed in claim 1, wherein a conical part of the diffuser diverges in a downstream direction, and wherein an inlet diameter is identical to a discharge outlet diameter, and wherein the extraction pipe extends at least partially into the diffuser and is concentric with the diffuser, and wherein an axially outer end of the extraction pipe is joined to a rear wall which serves to isolate the discharge outlet from the waste outlet.

13. An air filtration system which includes:

a plurality of air filtration banks as claimed in claim 1 arranged side-by-side in inline fashion in an air duct; and at least one grit collecting chute or hopper which is arranged in flow communication with the waste outlets of the respective cyclonic air classifiers.

14. The air filtration system as claimed in claim 13, wherein the grit collecting chute includes an auger or screw conveyor which is configured to discharge grit collected in a trough of the chute, wherein the grit collecting chute includes at least one openable inspection hatch, and wherein the grit collecting chute is hermetically sealed to the air filtration banks to prevent backward airflow from hampering the discharge of particles from the waste outlets into the chute.

15. The air filtration bank as claimed in claim 1, wherein the deflector is an annular deflector.

* * * * *